United States Patent [19]

Hershbarger

[11] Patent Number: 5,500,894
[45] Date of Patent: Mar. 19, 1996

[54] TELEPHONE LINE INTERFACE WITH AC AND DC TRANSCONDUCTANCE LOOPS

[75] Inventor: Russell A. Hershbarger, Nevada City, Calif.

[73] Assignee: Silicon Systems, Inc., Tustin, Calif.

[21] Appl. No.: 161,740

[22] Filed: Dec. 3, 1993

[51] Int. Cl.[6] .................................................. H04M 7/04
[52] U.S. Cl. .......................... 379/399; 379/415; 379/405
[58] Field of Search ..................................... 379/399, 414, 379/415, 413, 405, 324

[56] References Cited

U.S. PATENT DOCUMENTS

| | | | |
|---|---|---|---|
| 4,899,382 | 2/1990 | Gartner | 379/398 X |
| 4,935,960 | 6/1990 | Takato et al. | 379/399 X |
| 5,329,585 | 7/1994 | Susak et al. | 379/399 |

Primary Examiner—Jeffery Hofsass
Assistant Examiner—Scott Wolinsky
Attorney, Agent, or Firm—Hecker & Harriman

[57] ABSTRACT

A method and apparatus for providing a telephone line interface having selectable termination characteristics, such as impedance parameters, is provided using AC and DC transconductance loops. The present invention may be used with modem apparatus to provide regulatory compliance of line termination characteristics in multiple countries having different, even conflicting, standards or regulations. The preferred embodiment of the present invention uses a programmable switched capacitor filter to drive a transconductance driver that drives the telephone line. An AC transconductance loop controls AC transconductance characteristics, while a DC transconductance loop controls DC transconductance characteristics.

3 Claims, 15 Drawing Sheets

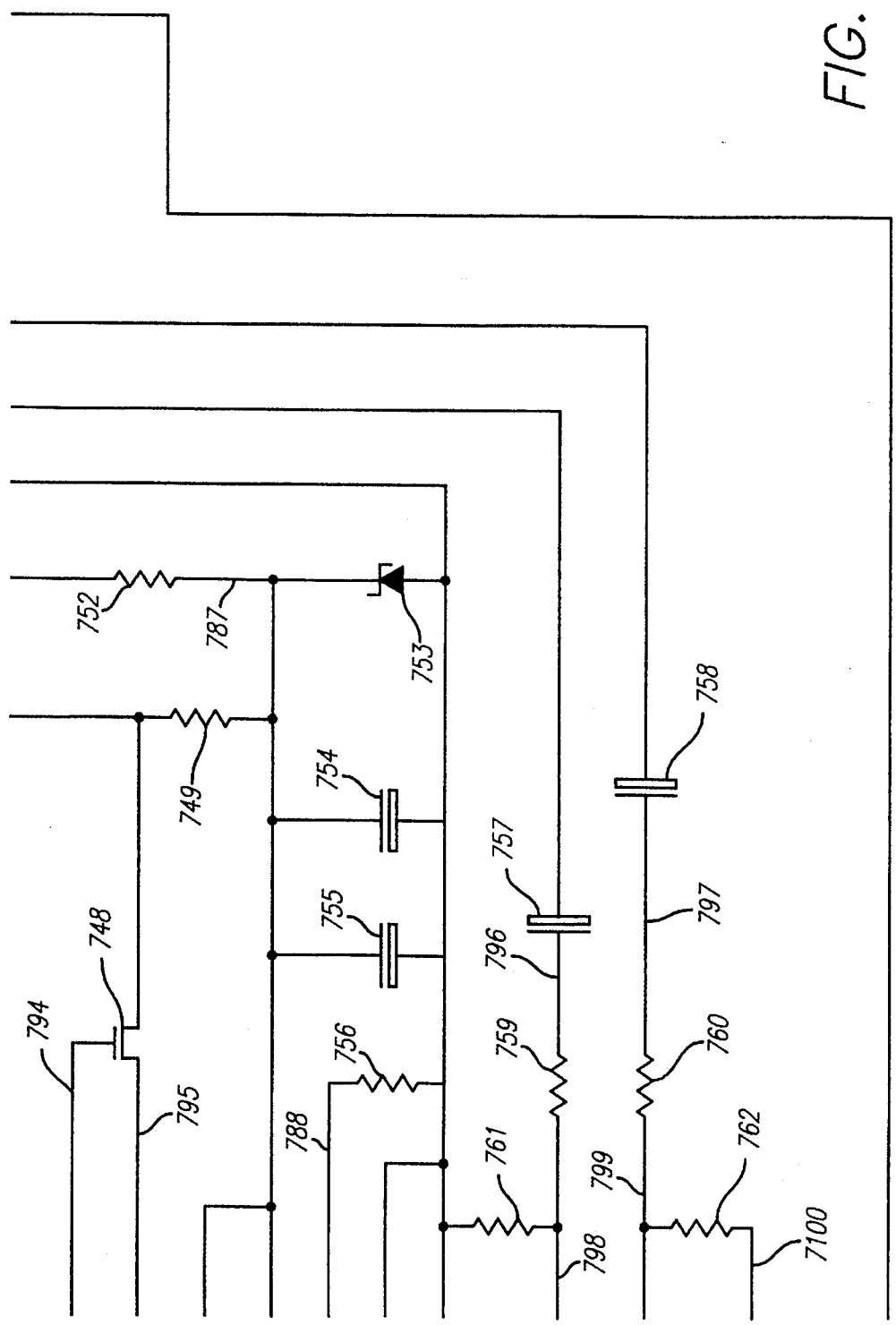

5,500,894

TELEPHONE LINE INTERFACE WITH AC AND DC TRANSCONDUCTANCE LOOPS

BACKGROUND OF THE INVENTION

1. Field of the Invention

The present invention relates to methods and apparatus for providing telephone line interfaces.

2. Background Art

There are an increasing number of devices that benefit from or require connection to a telephone line. Generally, compliance with governmental regulations is required for connection of equipment to a telephone line. The governmental regulations are intended to provide standards to ensure compatibility and to prevent harm to the public switched telephone network.

Since governmental regulations are usually issued at a national level, they usually relate to a particular country. Some countries may have regulations which may be different from, and possibly contradictory to, the regulations of other countries. Thus, a telephone line interface that meets the governmental regulations in one country may not meet the regulations of another country.

In the past, telephone equipment has typically been made to provide compatibility with only one or a limited number of countries or has been provided with a generic interface coupled to a detachable line interface module designed specifically for the particular country or countries in which it was to be used. The disadvantage to this type of telephone equipment is that it requires either complete replacement or the purchase of additional line interface modules for use in countries that have different regulatory requirements.

FIG. 9 is a diagram of a telephone line interface circuit of the prior art. Telephone line 905, which comprises tip and ring conductors, is coupled to protection devices and DC holding circuit 901. Protection devices and DC holding circuit 901 is coupled to node 908, which is coupled to a first terminal of a first winding of transformer 903. Protection devices and DC holding circuit 901 is also coupled to node 909, which is coupled to a second terminal of the first winding of transformer 903. A first terminal of the second winding of transformer 903 is coupled to node 910, which is coupled to transmit and receive circuits 902. A second terminal of the second winding of transformer 903 is coupled to node 911, which is coupled to transmit and receive circuits 902. Transmit signal TX is applied to node 906, which is coupled to transmit and receive circuits 902. Transmit signal TX is applied to node 906, which is coupled to transmit and receive circuits 902. Transmit and receive circuits 902 are coupled to node 907, which provides receive signal RX.

The first winding and the second winding of transformer 903 are isolated from each other so as to maintain high voltage barrier 904. Thus, great voltage differences between the circuits on the two sides of high voltage barrier 904 may exist without harm or interference to circuits on the other side of high voltage barrier 904.

Any signals desired to be transmitted over telephone line 905 are applied as signal TX at node 906. The signal to be transmitted is processed by transmit and receive circuits 902 and applied across node 910 and 911. The signals are coupled across coupling transformer 903 to nodes 908 and 909. The signals pass through protection devices and DC holding circuit 901 to be applied to telephone line 905. Signals on telephone line 905 pass through protection devices and DC holding circuit 101, through nodes 908 and 909 to transformer 903. Transformer 903 couples the received signals to nodes 910 and 911, which couple to receive signals to transmit and receive circuits 902. Transmit and receive circuits 902 output the receive signals at 907, which provides receive signal RX.

The windings of transformer 903 and the components associated therewith each have a characteristic impedance value. The characteristic impedance values of the components and the manner in which they are connected affects the impedance value presented to telephone line 905. For proper communication of signals, the impedances must be properly matched. Along with protection devices and DC holding circuit 901, the winding of transformer 903 coupled to nodes 908 and 909 may affect the impedance across telephone line tip and ring conductors 905. Since the impedance across the telephone line is usually subject to governmental regulations, the governmental regulations typically dictate characteristics of protection devices and DC holding circuit 901 and transformer 903. To conform with different governmental regulations, it may be necessary to replace or modify protection devices and DC holding circuit 901 and transformer 903. Such replacement or modification may be expensive and may even be impossible if the proper parts, tools, or knowledge is lacking.

SUMMARY OF THE INVENTION

The present invention provides a method and apparatus for providing a telephone line interface having AC and DC transconductance loops. The present invention allows control over telephone line termination characteristics. The present invention does not require the addition, substitution, or modification of components. The present invention provides a telephone line interface that can be easily configured for compatibility with multiple standards.

The present invention uses AC and DC transconductance loops to control the line termination characteristics of the telephone line. A DC transconductance loop controls the DC line termination characteristics, including the DC termination impedance, while an AC transconductance loop controls the AC line termination characteristics.

In the preferred embodiment of the present invention, to provide a DC transconductance loop, a signal from the telephone line is passed through a programmable continuous time filter to a transconductance driver. The transconductance driver drives the telephone line. To provide an AC transconductance loop, a signal from the telephone line is AC coupled to a switched capacitor filter to a transconductance driver. The transconductance driver drives the telephone line.

The switched capacitor filters may be programmable. That, their responses may be programmable, preferably via digital inputs. If the digital inputs are adjusted, the response of the filters changes, and the value of the line termination characteristics provided by the transconductance loops changes. Thus, by appropriately programming the filter control inputs, the line termination characteristics may be adjusted to the proper values to satisfy any applicable standards or regulations. Thus, the present invention overcomes the disadvantages of the prior art approaches.

BRIEF DESCRIPTION OF THE DRAWINGS

FIGS. 7, 7(A), 7(B), 7(C), and 7(D) are schematic diagrams illustrating a circuit comprising an embodiment of the present invention.

DETAILED DESCRIPTION OF THE INVENTION

A method and apparatus for providing a telephone line interface with AC and DC transconductance loops is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

As communication and transportation between countries becomes easier, people are more likely to travel between countries or to ship goods between countries. Thus, it would be ideal to have devices and goods that are compatible with the conditions, resources, standards, and regulations of all countries. However, different countries often have different conditions, resources, standards, and regulations that prevent compatibility. For example, telephone line parameters may vary from one country to another. Thus, a telephone line interface compatible with differing standards is needed.

The present invention provides a telephone line interface with line termination characteristics that are adjustable. Thus, the telephone line interface of the present invention may be adjusted to conform to different standards and regulations encountered in various countries. The present invention avoids the need for replacement or modification of parts to adjust line termination characteristics. Thus, the present invention provides easy and inexpensive worldwide telephone line compatibility.

The present invention provides a telephone line interface comprising two transconductance loops: an AC transconductance loop and a DC transconductance loop. The AC transconductance loop controls AC line termination characteristics, while the DC transconductance loop controls DC line termination characteristics. The DC line termination characteristics include the DC resistance. The AC line termination characteristics include the AC impedance, which may be complex. The AC and DC line termination characteristics are actively controlled in the off-hook state.

Figure 1:
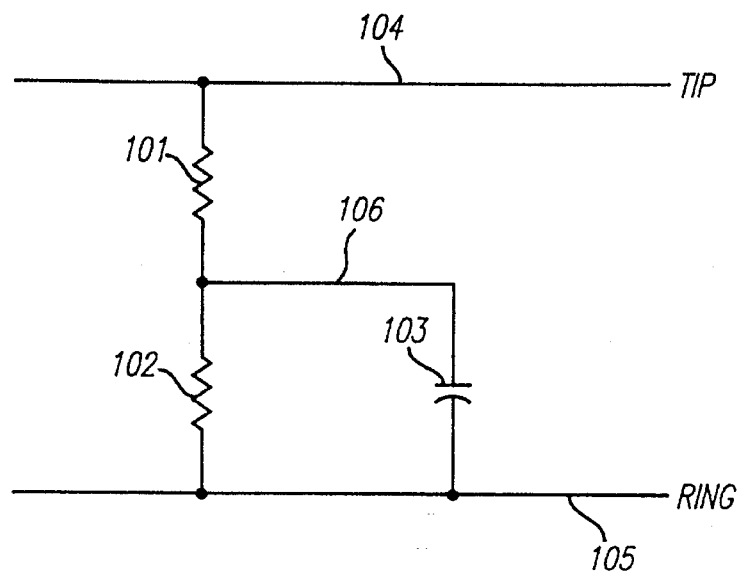
FIG. 1 is a schematic diagram illustrating a model of the complex line impedance required at the termination of a telephone line.

FIG. 1 is a schematic diagram illustrating a model of the complex line impedance required at the termination of a telephone line. The telephone line comprises tip conductor 104 and ring conductor 105. Tip conductor 104 is coupled to a first terminal of resistor 101. A second terminal of resistor 101 is coupled through node 106 to a first terminal of resistor 102 and to a first terminal of capacitor 103. A second terminal of resistor 102 is coupled to ring conductor 105. A second terminal of capacitor 103 is coupled to ring conductor 105.

Figure 2:
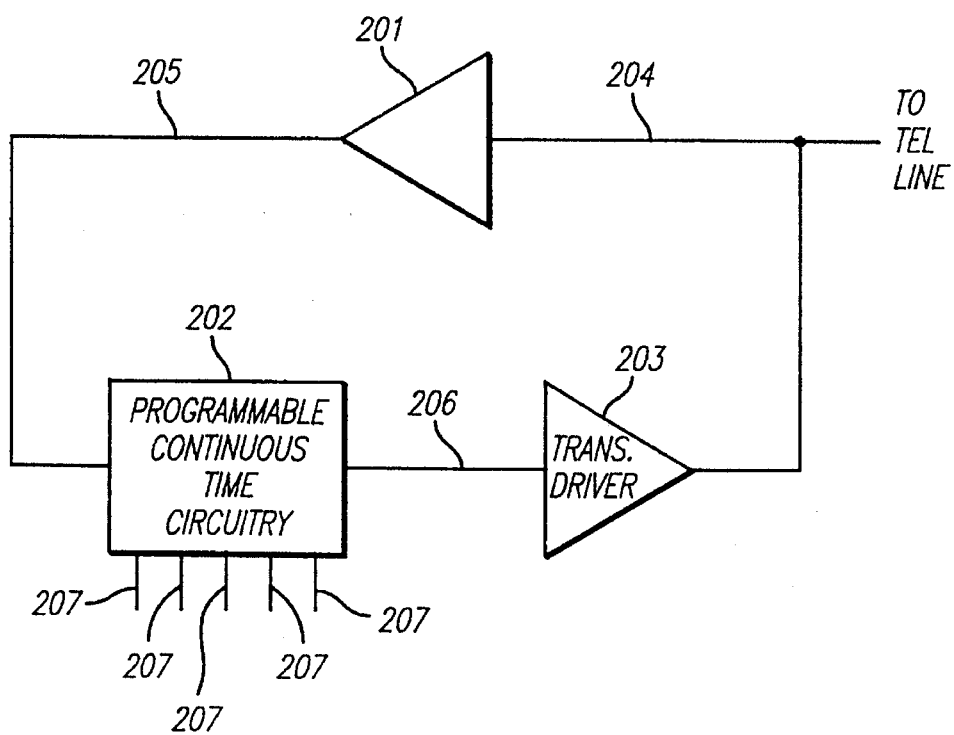
FIG. 2 is a block diagram illustrating a DC transconductance loop according to the present invention.

FIG. 2 is a block diagram illustrating a DC transconductance loop according to the present invention. A telephone line conductor is coupled to node 204. Node 204 is coupled to an input of amplifier 201. The output of amplifier 201 is coupled to node 205. Node 205 is coupled to an input of programmable continuous time circuitry 202. The output of programmable continuous time circuitry 202 is coupled to node 206. Node 206 is coupled to an input of transconductance driver 203. The output of transconductance driver 203 is coupled to node 204. Control inputs 207 are coupled to programmable continuous time circuitry 202.

Control input 207 may be used to control the operation of programmable continuous time circuitry 202, allowing the DC line termination impedance to be controlled.

Figure 3:
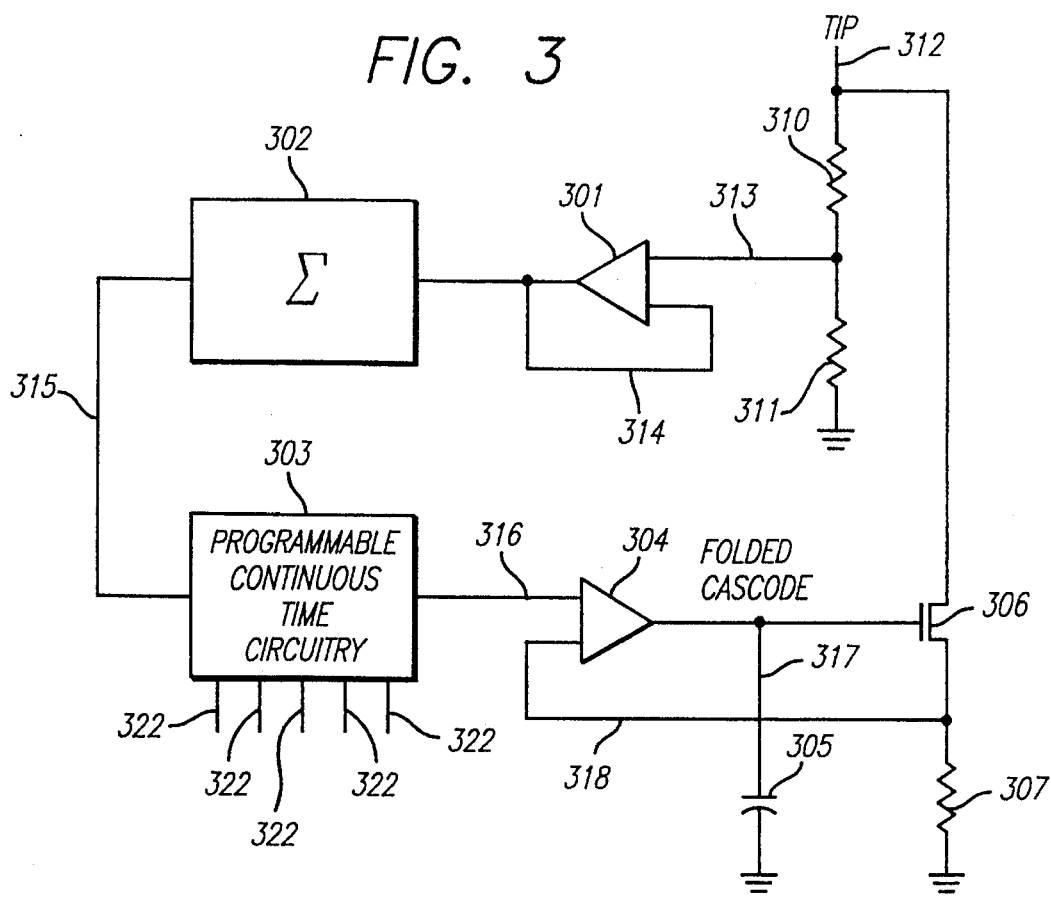
FIG. 3 is a diagram illustrating an embodiment of a DC transconductance loop according to the present invention.

FIG. 3 is a diagram illustrating an embodiment of a DC transconductance loop according to the present invention. Tip conductor 312 is coupled to the first terminal of resistor 310 and to the first terminal of NMOS FET 306. The second terminal of resistor 310 is coupled through node 313 to the first terminal of resistor 311, to an input amplifier 301. The second terminal of resistor 311 is coupled to ground. The output of amplifier of 301 is coupled through node 314 to an input of amplifier 301 and to an input of summation block 302. The output of summation 302 is coupled through node 315 to an input of programmable continuous time circuitry 303. The output of programmable continuous time circuitry 303 is coupled through node 316 to an input of amplifier 304. The output of amplifier 304 is coupled through node 317 to the gate of NMOS FET 306 and to the first terminal of capacitor 305. The second terminal of capacitor 305 is coupled to ground. The second terminal of NMOS FET 306 is coupled through node 318 to an input of amplifier 304 and to the first terminal of resistor 307. The second terminal of resistor 307 is coupled to ground. Control inputs 322 of programmable continuous time circuitry 303 may be used to control the operation of programmable continuous time circuitry 303. A folded cascode comprising amplifier 304 and NMOS FET 306 provides transconductance control.

Summation block 302 performs the summation of the signal at node 314, which includes AC and DC components, with a signal that is the negative of the AC component. This summation results in the cancellation of the AC component, leaving only the DC component. Other forms of low pass filtering may alternatively be used to separate the AC component from the DC component.

Figure 4:
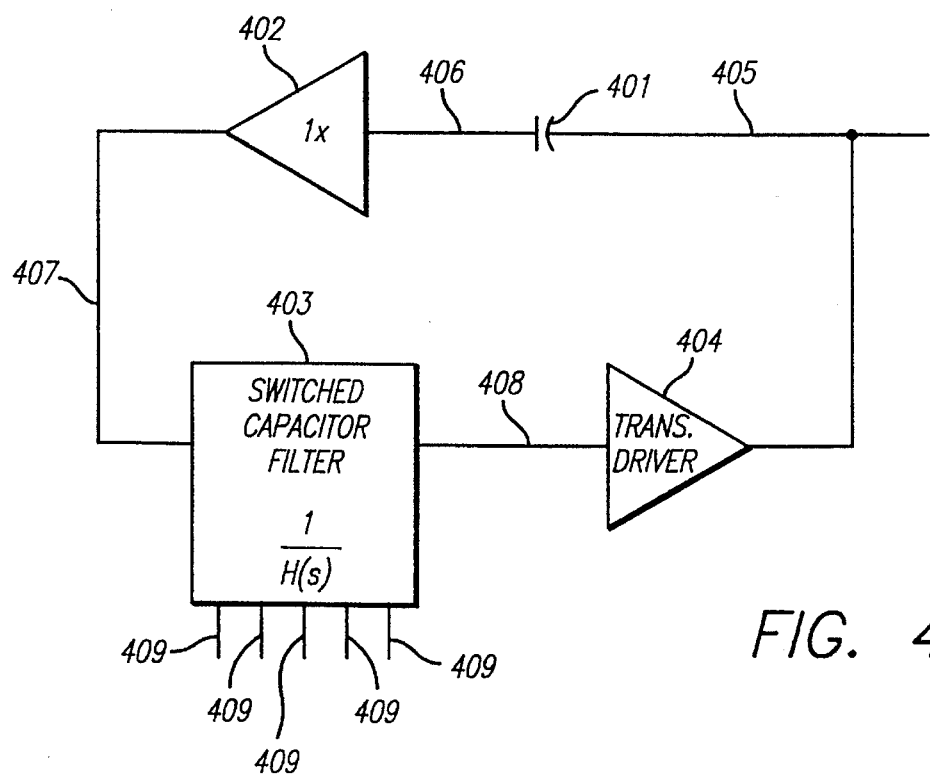
FIG. 4 is a block diagram of an embodiment of an AC transconductance loop according to the present invention.

FIG. 4 is a block diagram of an embodiment of an AC transconductance loop according to the present invention. A conductor of the telephone line is coupled to node 405. Node 405 is coupled to the first terminal of capacitor 401. The second terminal of capacitor 401 is coupled through node 406 to unity gain buffer and anti-alias low pass filter 402. The output of unity gain buffer and anti-alias low pass filter 402 is coupled through node 407 to the input of switched capacitor filter 403. The output of switched capacitor filter 403 is coupled through node 408 to an input transconductance driver 404. The output of transconductance driver 404 is coupled to node 405. Control inputs 409 are provided to control the operation of switched capacitor filter 403.

Signals present at node 405 are AC coupled through capacitor 401 to unity gain buffer and anti-alias low pass filter 402, which preferably has a gain of one. The output of unity gain buffer and anti-alias low pass filter 402 provides a signal to switched capacitor filter 403. The response of switched capacitor filter 403 may be selected using control inputs 409. By appropriately adjusting the response of switched capacitor filter 403, the circuit provides appropriate telephone line AC impedance matching. The output of switched capacitor filter 403 is coupled to transconductance driver 404, which is coupled to the telephone line conductor and provides the appropriate telephone line AC termination impedance.

Figure 5:
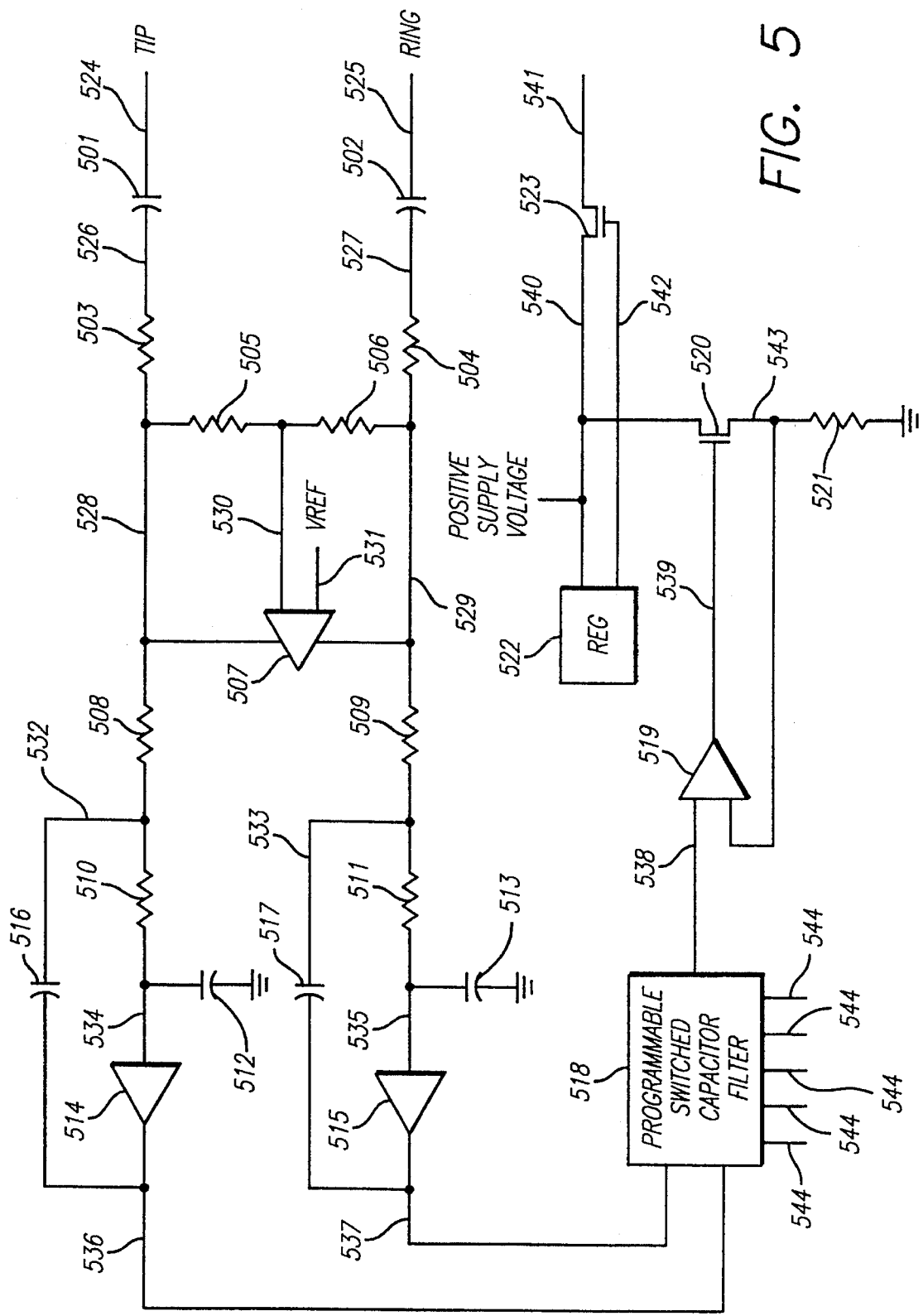
FIG. 5 is a diagram of an embodiment of an AC transconductance loop according to the present invention.

FIG. 5 is a diagram of an embodiment of an AC transconductance loop according to the present invention. Telephone line tip conductor 524 is coupled to a first terminal of capacitor 501. Telephone line ring conductor 525 is coupled to a first terminal of capacitor 502. The second terminal of capacitor 501 is coupled through node 526 to the first terminal of resistor 503. The second terminal of capacitor 502 is coupled through node 527 to a first terminal of resistor 504. A second terminal of resistor 503 is coupled through node 528 to a first terminal of resistor 505, to a first terminal of resistor 508, and to an output of amplifier 507. The second terminal of resistor 505 is coupled through node 530 to an input of amplifier 507 and to an first terminal of resistor 506. The second terminal of resistor 504 is coupled through node 529 to a second terminal of resistor 506, to a first terminal of resistor 509, and to an output of amplifier 507. Reference voltage VREF is coupled through node 531 to an input of amplifier 507. The second terminal of resistor 508 is coupled through node 532 to a first terminal of resistor 510 and to a first terminal of capacitor 516. A second terminal of resistor 510 is coupled through node 534 to a first terminal of capacitor 512 and to an input of amplifier 514. The second terminal of capacitor 512 is coupled to ground. The second terminal of capacitor 516 is coupled through node 536 to the output of amplifier 514 and to an input of programmable switched capacitor filter 518. The second terminal of resistor 509 is coupled through node 533 to the first terminal of resistor 511 and to the first terminal of capacitor 517. The second terminal of resistor 511 is coupled through node 535 to the first terminal of capacitor 513 and to an input of amplifier 515. The second terminal of capacitor 513 is coupled to ground. The second terminal of capacitor 517 is coupled through node 537 to the output of amplifier 515 and to an input of programmable switched capacitor filter 518.

The output programmable switched capacitor filter 518 is coupled through node 538 to an input of amplifier 519. The output amplifier 519 is coupled through node 539 to the gate of NMOS FET 520.

The positive supply voltage is coupled through node 540 to regulator 522 to a first terminal of NMOS FET 523, and to the first terminal of NMOS FET 520. The gate NMOS FET 523 is coupled through node 542 to regulator 522. The second terminal NMOS FET 523 is coupled to node 541. The second terminal of NMOS FET 520 is coupled through node 543 to an input of amplifier 519 and to a first terminal of resistor 521. The second terminal of resistor 521 is coupled to ground.

Signals present in telephone line conductors 524 and 525 are coupled through capacitors 501 and 502 to a single ended to differential conversion network comprising resistors 503, 504, 505, 506, 508, 509, 510, and 511, amplifiers 507, 514, and 515, and capacitors 512, 513, 516, and 517. The single ended to differential conversion network provides differential signals across nodes 536 and 537 to programmable switched capacitor filter 518.

Control inputs 544 are provided to control the response of programmable switched capacitor filter 518. By controlling the response of programmable switched capacitor filter 518, the telephone line AC impedance may be set to a desired value, allowing matching of the AC termination impedance to AC termination impedances specified by national regulations or technical specifications. Since control inputs 544 may be used to set programmable switched capacitor filter 518 to any one of a number of possible responses, the AC line termination impedance for any one of a number of countries may be matched. The output of programmable switched capacitor filter 518 is provided to a folded cascode configuration comprising amplifier 519 and NMOS FET 520. The folded cascode provides the transconductance for setting the desired AC line termination impedance.

Regulator 522 controls the supply voltages, which are derived from the telephone line. Node 541 is coupled to a conductor of the telephone line. Regulator 522 uses NMOS FET 523 to regulate the positive supply voltage present at node 540.

Figure 6A:
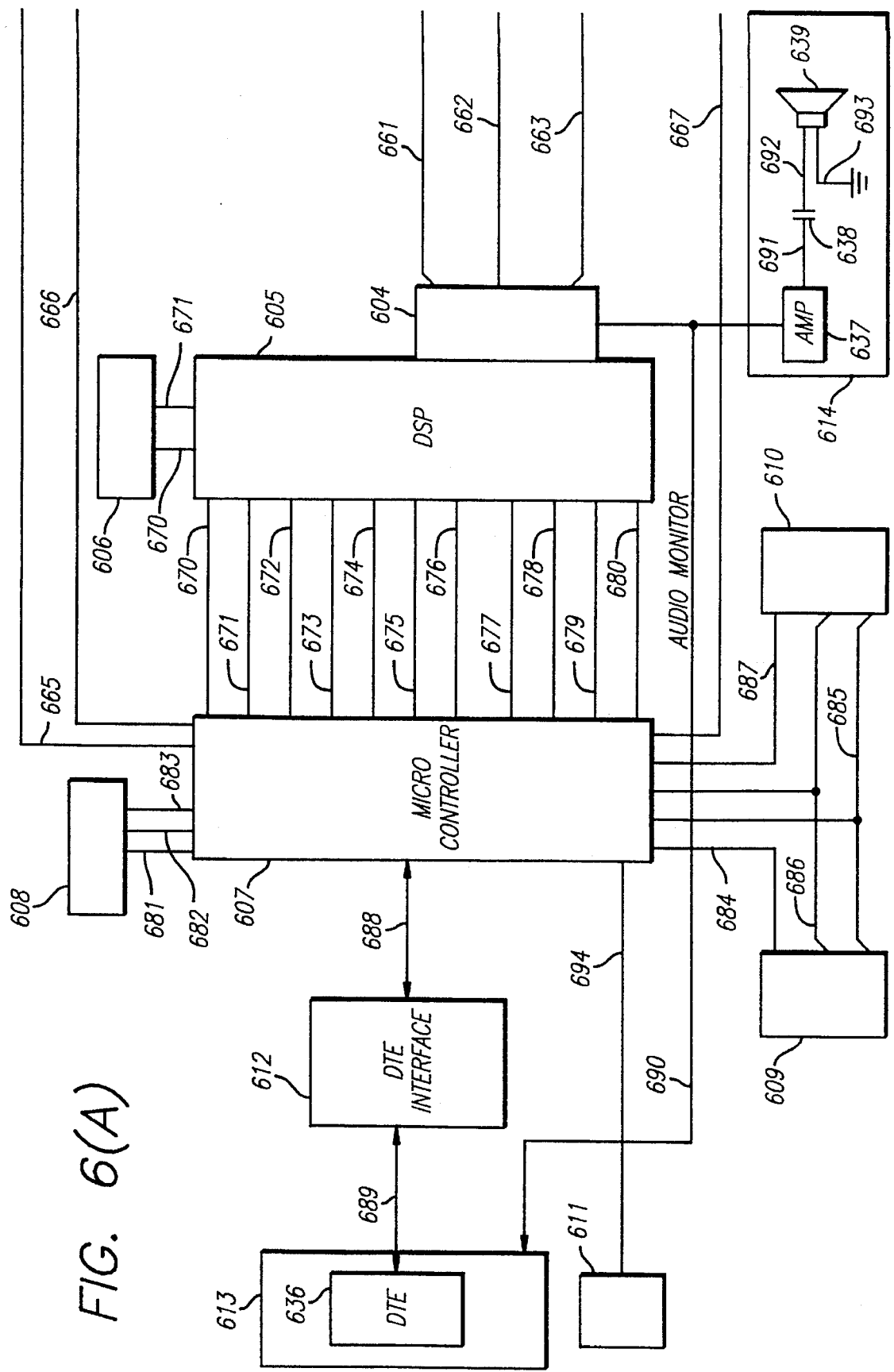
FIGS. 6(A) and 6(B) are diagrams of a system that comprises an embodiment of the present invention.
Figure 6B:
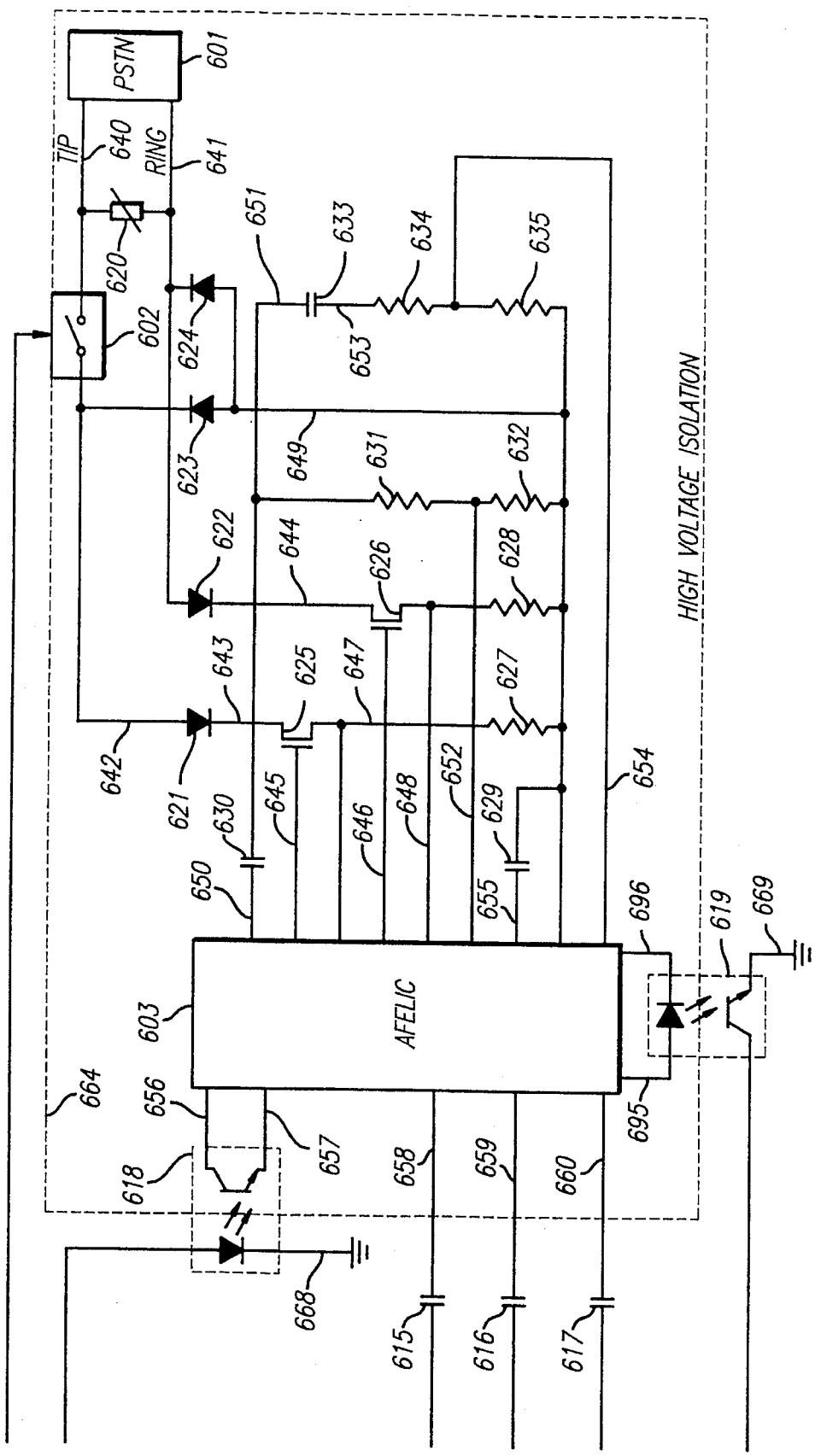
Figure 7:
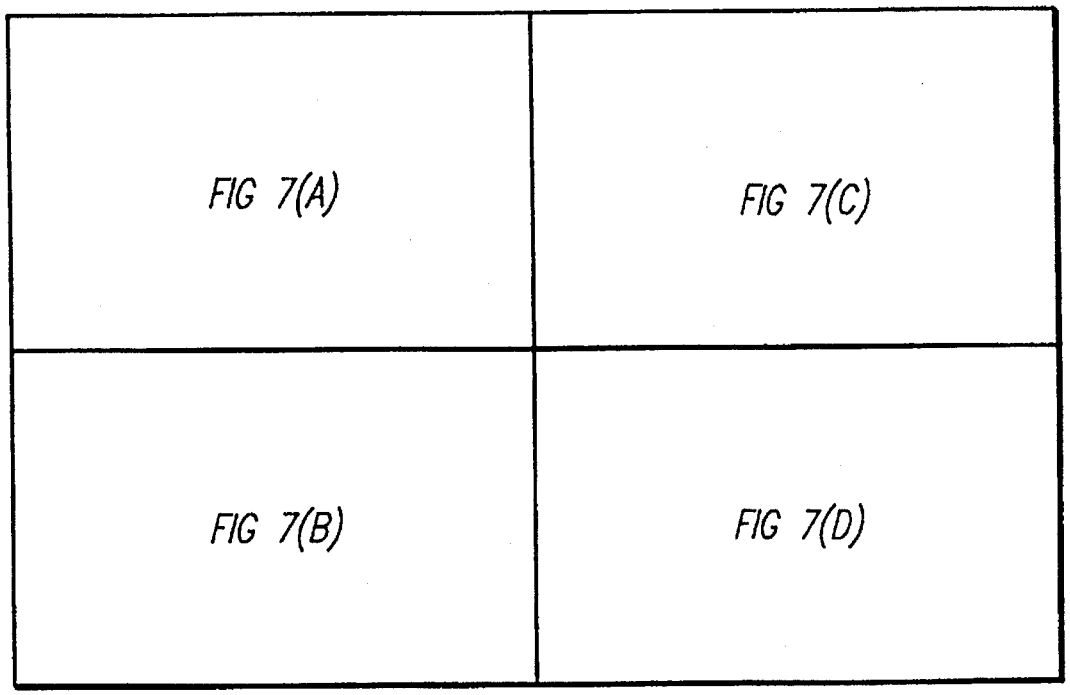
Figure 7A:
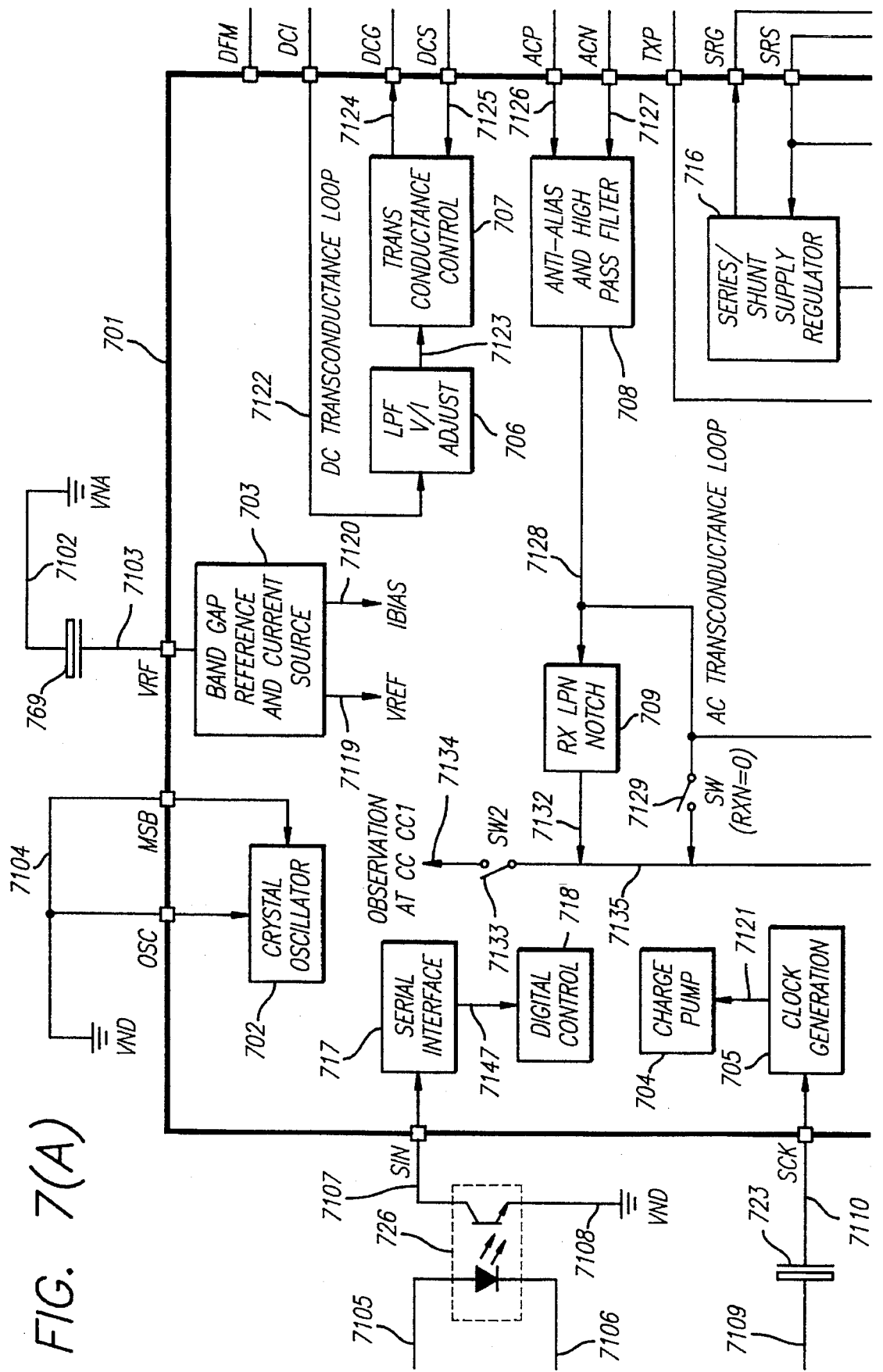
Figure 7B:
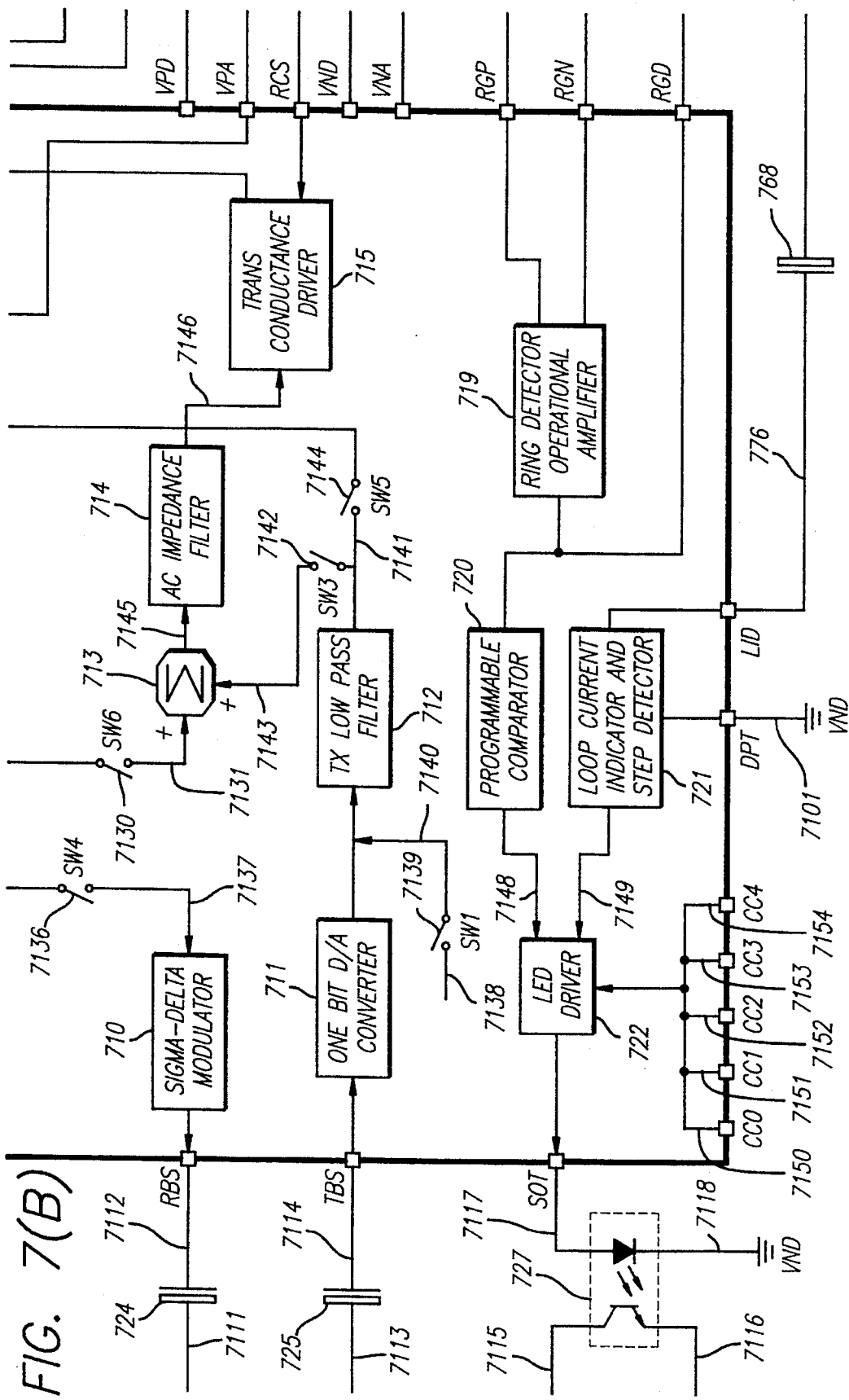
Figure 7C:
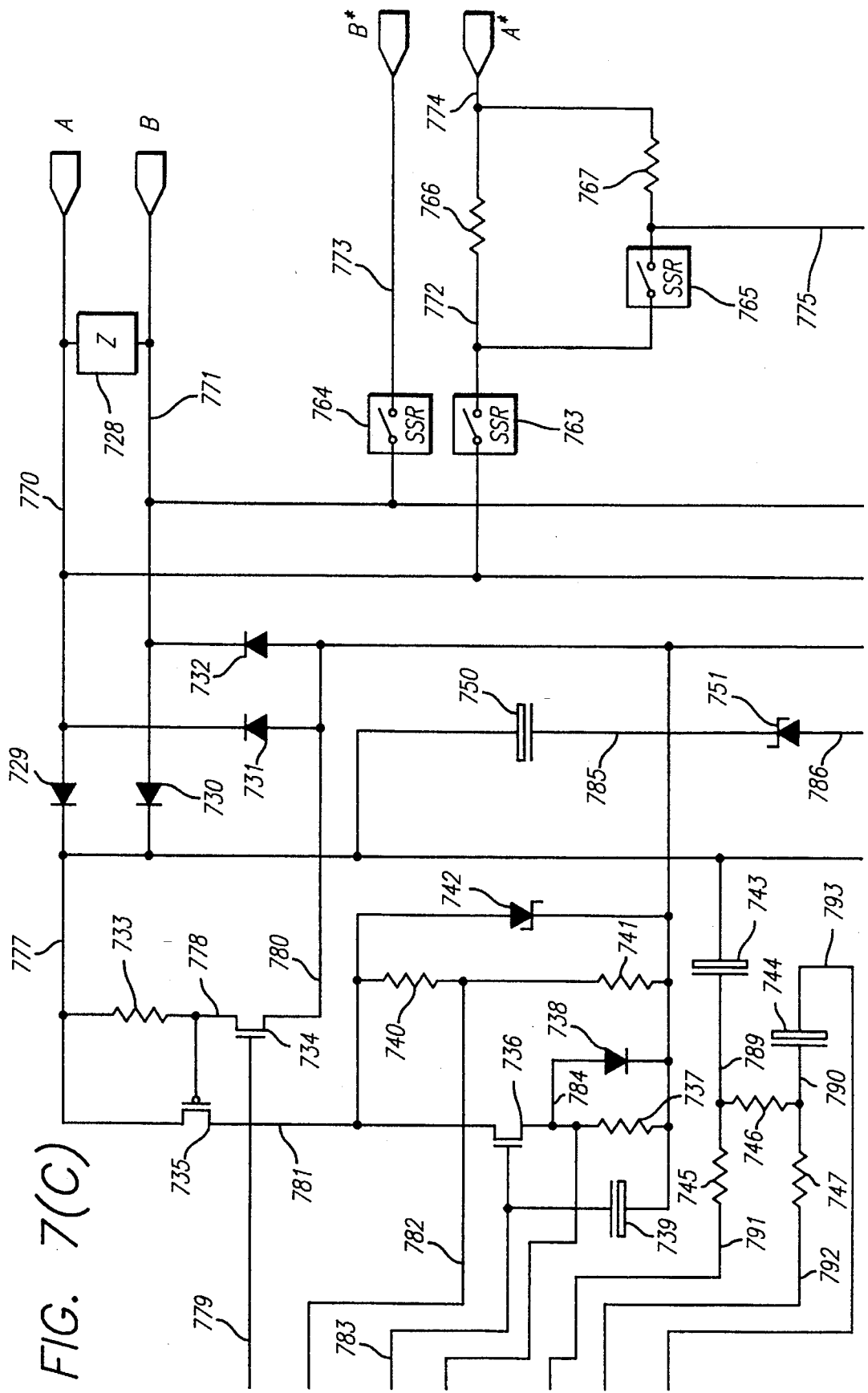

FIGS. 6(A) and 6(B) are diagrams of a system that comprises an embodiment of the present invention. Tip connector 640 and ring conductor 641 are coupled to public switched network 601. Protector 620, which may be a varistor, such as a metal oxide varistor (MOV), or a sidactor, is coupled across tip conductor 640 and ring conductor 641. Tip conductor 640 is coupled to a first terminal of hook switch 602. A second terminal of hook switch 602 is coupled to node 642. Node 642 is coupled to the anode of diode 621 and to the cathode of diode 623. Ring conductor 641 is coupled to the anode of diode 622 and to the cathode of diode 624. The anode of diode 623 is coupled to the anode of diode 624 at node 649. The cathode of diode of 621 is coupled to node 643 and to the first terminal of field effect transistor (FET) 625. The gate of FET 625 is coupled to node 645 and to analog front and line interface circuit 603. The second terminal of FET 625 is coupled to node 647, to analog front and line interface circuit (AFELIC) 603, and to the first terminal of resistor 627. The cathode of diode 622 is coupled to node 644 and to the first terminal of FET 626. The gate of FET 626 is coupled to node 646 and to AFELIC 603. The second terminal of FET 626 is coupled to node 648, to AFELIC 603 and to the first terminal of resistor 628.

AFELIC 603 is coupled to node 650 and to the first terminal of capacitor 630. The second terminal of capacitor 630 is coupled to the first terminal of resistor 631 and to the first terminal of capacitor 633 at node 651. The second terminal of resistor 631 is coupled to AFELIC 603 and to the first terminal of resistor 632. The second terminal of capacitor 633 is coupled to node 653 and to the first terminal of resistor 634. The second terminal of resistor 634 is coupled to node 654 and to AFELIC 603. The second terminal of resistor 634 is also coupled to the first terminal of resistor 635. AFELIC 603 is coupled to node 655 and to the first terminal of capacitor 629. The second terminal of capacitor 629 is coupled to AFELIC 603. The second terminal of resistor 627, the second terminal of resistor 628, the second terminal of resistor 632 and the second terminal of resistor 635.

AFELIC 603 is coupled to node 695, which is coupled to the anode of the LED of optocoupler 619. The cathode of the LED of optocoupler 619 is coupled to node 696, which is coupled to AFELIC 603. AFELIC 603 is coupled to node 656, which is coupled to the collector of the photo transistor of optocoupler 618. The emitter of the photo transistor of optocoupler is coupled to node 657, which is coupled to AFELIC 603. AFELIC 603 is coupled to node 658, node 659, and node 660. Node 658 is coupled to the first terminal of capacitor 615. Node 659 is coupled to the first terminal of capacitor 656. Node 660 is coupled to the first terminal of capacitor 617. The above-described circuitry is illustrated as contained within high voltage isolation barrier 664. The high voltage isolation barrier provides the necessary isolation between the voltages that may be present on the public switched telephone network 601 and the host system 613.

The second terminal of capacitor 615 is coupled to node 661, which is coupled to analog front end interface (AFE interface) 604. The second terminal of capacitor 616 is coupled to node 662, which is coupled to AFE interface 604. The second terminal of capacitor 617 is coupled to node 663, which is coupled to AFE interface 604. AFE interface 604 provides an analog audio monitor signal at node 690. Node 690 is coupled to host block 613 and to amplifier 637 of audio output block 614. Amplifier 637 provides an output signal at node 691 which passes through capacitor 638 to appear at node 692. Node 692 is coupled to the first terminal of speaker 639. The second terminal of speaker 639 is coupled to node 693, which is coupled to ground. Audio output block 614 comprises amplifier 637, capacitor 638, and speaker 639. The audio monitor signal at node 690 is coupled to host block 613. AFE interface 604 is coupled to DSP block 605.

DSP block 605 is coupled through nodes 670 and 671 to block 606. DSP block 605 is also coupled to microcontroller 607 through nodes 670, 671, 672, 673, 674, 675, 676, 677, 678, 679, and 680. Microcontroller 607 is coupled through node 665 to the control terminal of hook switch 602. Microcontroller 607 is also coupled through node 666 to the anode of the LED of optocoupler 618. The cathode of the LED of optocoupler 618 is coupled to node 668, which is coupled to ground. Microcontroller 608 is coupled through node 667 to the collector of the phototransistor of optoisolator 619. The emitter of the phototransistor of optoisolator 619 is coupled to node 669, which is coupled to ground.

Microcontroller 607 is coupled through nodes 681, 682, and 683 to block 608. Microcontroller 607 is coupled through nodes 684, 684, 685, 686, and 687 to block 609 and block 610. Microcontroller 607 is coupled through bus 694 to block 611. Microcontroller 607 is coupled through bus 688 to DTE interface 612. DTE interface 612 is coupled through bus 689 to the DTE circuit 636 of host system 613.

FIGS. 7, 7(A), 7(B), 7(C), and 7(D) are schematic diagrams illustrating a circuit comprising an embodiment of the present invention. Analog front end line interface circuit 701 comprises crystal oscillator 702, bandgap reference and current source 703, charge pump 704, clock generation block 705, low pass filter V/I adjustment block 706, transconductance control block 707, anti alias and high pass filter block 708, receive low pass and notch filter block 709, sigma-delta modulator 710, one bit D/A converter 711, transmit low pass filter 712, summer 713, AC impedance filter 714, transconductance driver 715, series/shunt supply regulator 716, serial interface 717, digital control block 718, ring detector operational amplifier 719, programmable comparator 720, loop current indicator and step detector 721, and photodiode driver 722.

The two conductors of a telephone line are coupled to nodes 770 and 771. Protector 728, which may be a varistor, metal oxide varistor (MOV), or a sidactor, is coupled across telephone line conductors 770 and 771. Telephone line conductor 770 is coupled to the anode of diode 729, the cathode of diode 731, the first terminal of solid state relay 763, and the first terminal of capacitor 757. Telephone line conductor 771 is coupled to the anode of diode 730, to the cathode of diode 732, to the first terminal of solid state relay 764, and to the first terminal of capacitors 758. The second terminal of solid state relay 764 is coupled to node 773. The second terminal of solid state relay 763 is coupled to node 772. Node 772 is coupled to the first terminal of solid state relay 765, and to the first terminal of resistor 766. The second terminal of solid state relay 765 is coupled to the first terminal of resistor 767 and to the first terminal of capacitor 768. The second terminal of resistor 766 is coupled to node 774 and to the second terminal of resistor 767.

The second terminal capacitor 768 is coupled through node 776 to loop current indicator and step detector 721. Loop current indicator and step detector 721 is coupled through node 7101 to voltage VND, which is a digital ground. Loop current indicator and step detector 721 is coupled through node 7149 to photodiode driver 722. The second terminal of capacitor 757 is coupled through node 796 to the first terminal of resistor 759. The second terminal of capacitor 758 is coupled through node 797 to the first terminal of capacitor 760. The second terminal resistor 759 is coupled through node 798 to the first terminal of resistor 761 and to an input of ring detection operational amplifier 719. The second terminal of resistor 760 is coupled through node 799 to the first terminal of resistor 762 and to an input of ring detection operational amplifier 719. The second terminal of resistor 761 is coupled to node 780, which is coupled to voltages VNA and VND, which are analog and digital grounds, respectively.

The second terminal of resistor 762 is coupled through node 7100 to the output of ring detection operational amplifier 719 and to an input of programmable comparator 720. The output of programmable comparator 720 is coupled through node 7148 to LED driver 722. Inputs CC0, CC1, CC2, CC3, and CC4, which appear at nodes 7150, 7151, 7152, 7153, and 7154, respectively, are coupled to LED driver 722. The output of LED driver 722 is coupled through 7117 to the anode of the LED of optocoupler 727. The cathode of the LED of optocoupler 727 is coupler through node 7118 to voltage VND, which a digital ground. Node 1115 is coupled to the collector of the phototransistor optocoupler 727. The emitter of the phototransistor of optocoupler 727 is coupled to node 7116.

Node 7105 is coupled to the anode the LED of optocoupler 726. The cathode of the LED of optocoupler 726 is coupled to node 7106. The emitter of the phototransistor of optocoupler 726 is coupled through node 7108 to voltage VND, which is a digital ground. The collector of the phototransistor of optocoupler 726 is coupled through node 7107 to an input of serial interface 717. The output serial interface 717 is coupled through node 7147 to digital control block 718.

Voltage VND, which is a digital ground, is coupled through node 7104 to crystal oscillator 702. Bandgap current source 703 is coupled through node 7103 to the first terminal of capacitor 769. The second terminal of capacitor 769 is coupled through node 7102 to voltage VNA, which is an analog ground. Bandgap current source 703 provides voltage VREF at nodes 7119 and current IBIAS at node 7120.

The cathode of diode 729 is coupled through node 777 to the first terminal of PMOS FET 735, to the first terminal of resistor 733, to the cathode of diode 730, to the first terminal of capacitor 750, to the first terminal of capacitor 743, to the first terminal of resistor 749, and to the first terminal of NMOS FET 748. The second terminal of resistor 733 is coupled through node 778 to the gate terminal PMOS FET 735, and to the first terminal of NMOS FET 734. The second terminal of PMOS FET 735 is coupled through node 781 to the first terminal of NMOS FET 736, to the first terminal of resistor 740, and to the cathode of zener diode 742.

Output DFM of analog front end interface circuit 701 is coupled through node 779 to the gate of NMOS FET 734. The second terminal of resistor 740 is coupled through node 782 to input DCI of analog front end line interface circuit 701. Input DCI is coupled though node 7122 to an input of low pas filter and voltage/current (V/I) adjustment block 706. An output of low pass filter and V/I adjustment block 706 is coupled through node 7123 to an input of transconductance control block 707. The second terminal of resistor 740 is also coupled to the first terminal of resistor 741. An output of transconductance control block 707 is coupled through nodes 7124 to output OCG. Output OCG of AFELIC 701 is coupled through node 783 to the gate of NMOS FET 736 and to the first terminal of capacitor 739. The second terminal of NMOS FET 736 is coupled through node 784 to the anode of diode 738, to the first terminal of resistor 737, and to input DCS of AFELIC 701. Input DCS is coupled through node 7125 to transconductance control block 707.

Node 7109 is coupled to the first terminal of capacitor 723. The second terminal of capacitor 723 is coupled through node 7110 to clock generation circuit 705. The output of clock generation circuit 705 is coupled through node 7121 to an input of charge pump 704.

Node 7113 is coupled to the first terminal of capacitor 725. The second terminal of capacitor 725 is coupled through node 7114 to an input of one bit digital to analog (D/A) converter 711. The output of one bit D/A converter 711 is coupled through node 7140 to an input of transmit low pass filter 712. The drive point signal at inputs CC3 and CC4 are coupled through node 7138 to the first terminal of switch 7139. The second terminal of switch 7139 is coupled through node 7140 to transmit low pass filter 712. The output of transmit low pass filter 712 is coupled through nodes 7141 to the first terminal of switch 7142 and to the first terminal of switch 7144. The second terminal switch 7142 is coupled through node 7143 to a non inverting input of summer 713. The second terminal of switch 7144 is coupled through node 793 to the first terminal of capacitor 744.

The second terminal of capacitor 743 is coupled through node 789 to the first terminal of resistor 746 and to the first terminal of resistor 745. The second terminal of capacitor 744 is coupled through node 790 to the second terminal resistor 746 and to the first terminal of resistor 747. The second terminal of resistor 745 is coupled through node 791 to input ACP of AFELIC 701. Input ACP is coupled through node 7126 to an input of anti alias and high pass filter 708. The second terminal of resistor 747 is coupled through node 792 to input ACN of AFELIC 701. Input ACN is coupled through node 7127 to an input of anti alias and high pass filter 708.

The output of anti alias and high pass filter 708 is coupled through node 7128 to an input of low pass and notch filter 709, to the first terminal of switch 7129, and to the first terminal of switch 7130. The second terminal of switch 7130 is coupled through node 7131 to a non inverting input of summer 713.

The output of receive low pass and notch filter 709 is coupled through node 7132 to the first terminal of switch 7133, and through node 7135 to the first terminal of switch 7136. The second terminal of switch 7129 is also coupled to the first terminal of switch 7133 and the first terminal of switch 7136. The second terminal of switch 7133 is coupled through node 7134 to an observation signal at input CC0 and CC1. The second terminal of switch 7136 is coupled through node 7137 to an input of sigma delta modulator 710. The output of sigma delta modulator 710 is coupled through node 7112 to the first terminal of capacitor 724. The second terminal of capacitor 724 is coupled to node 7111.

The output of summer 713 is coupled through node 7145 to the input of AC impedance filter 714. The output of AC impedance filter is coupled through node 7146 to a first input of transconductance driver 715. A second input of transconductance driver 715 is coupled through node 788 to the first terminal of resistor 756. The output of transconductance driver 715 is coupled to an input of series/shunt supply regulator 716. The second terminal of NMOS FET 748 is coupled through node 795 to an input of series/shunt supply regulator 716. An output of series/shunt supply regulator 716 is coupled through node 794 to the gate terminal of NMOS FET 748.

The second terminal of capacitor 750 is coupled through node 785 to the cathode of zener diode 751. The anode of zener diode 751 is coupled through node 786 to the first terminal of resistor 752.

Series/shunt supply regulator 716 is coupled to voltages VPA and VPD, which are analog and digital supply voltages, respectively. Voltages VPA and VPD are also coupled through node 787 to the second terminal of resistor 749, to the second terminal of resistor 752, to the first terminal of capacitor 755, to the first terminal of capacitor 754, and to the cathode of zener diode 753.

The second terminal of NMOS FET 734 is coupled through node 780 to the anode of diode 731, to the anode of diode 732, to the anode zener diode 742, to the second terminal of resistor 741, to the cathode of diode 738, to the second terminal of resistor 737, to the second terminal of capacitor 739, to the anode of zener diode 753, to the second terminal of capacitor 754, to the second terminal of capacitor 755, to the second terminal of resistor 756, and to voltages VNA and VND, which are analog and digital grounds, respectively.

The telephone line which comprises conductors 770 and 771 is full-wave rectified by diodes 729, 730, 731, and 732 to provide a negative voltage at the anodes of diodes 731 and 732 and a positive voltage at the cathodes of diodes 729 and 730. The negative voltage at the anodes of diodes 731 and 732 is coupled to voltage VND and voltage VNA. Thus, the negative voltage at the anodes of diodes 731 and 732 is used as both an analog and digital ground. The positive voltage at the cathodes of diodes 729 and 730 is regulated by series/shunt supply regulator 716 to provide voltages VPA and VPD, the positive analog and digital supply voltages respectively.

A sigma-delta modulated transmit signal at node 7113 is coupled through capacitor 725 to one bit D/A converter 711. One bit D/A converter 711 converts the sigma-delta bit stream to an analog signal. Transmit low pass filter 712 filters the analog signal to reduce quantization noise. The filtered analog transmit signal is provided to summer 713 and is also applied to a single-ended to differential conversion circuit comprising capacitors 743 and 744 and resistors 745, 746, and 747. The differential input signal from the single-ended to differential conversion network is applied to anti-alias and high-pass filter 708, which removes components of the signal that would otherwise be aliased during sigma-delta modulation. The filtered signal is passed through receive low-pass and notch filter 709 to sigma-delta modulator 710. Receive low-pass and notch filter 709 may be bypassed by switch 7129. Sigma-delta modulator 710 produces a sigma-delta bit stream of the receive signal that is coupled through capacitor 724 to node 7111.

Since the transmit signal at node 793 is a single ended signal referenced to voltage VNA, which is derived from the negative side of the telephone line, and the signal at node 777 is derived from the positive side of the telephone line, the signal applied to capacitor 743 has a voltage equal to the voltage of the positive side of the telephone line, neglecting diode drops, and the signal applied to capacitor 744 has a voltage equal to the negative side of the telephone line offset in a positive direction by the magnitude of the transmit signal, again neglecting diode voltage drops. If the transmit signal is 0, the signal applied capacitor 744 has a voltage equal to the voltage of the negative side of the telephone line. Thus, the voltage across the telephone line is applied across capacitors 743 and 744. Since any received signal is present across the telephone line, the received signal will be applied to capacitors 743 and 744. The received signal is then filtered, sigma-delta modulated, and coupled across capacitor 724 to node 7111.

If a transmit signal is applied to node 7113, it is coupled through capacitor 725 to one bit D/A converter 7111. One bit D/A converter 711 converts the sigma-delta bit stream input to an analog transmit signal, which is low-pass filtered by transmit low-pass filter 712. The low-pass filtered analog transmit signal is summed with the signal at node 7131 and passed through AC impedance filter 714 to transconductance driver 715. Transconductance driver 715 causes the transmit signal to be applied to the phone line.

Since transconductance driver 715 applies the transmit signal to the telephone line, both the transmit signal and the receive signal are present simultaneously on the telephone line. To properly receive the receive signal, it is necessary to separate the receive signal from the transmit signal. The function of separating the transmit signal from the receive signal is commonly referred to as the hybrid function.

To provide the hybrid function, the transmit signal is applied to node 793. Since the transmit signal is applied to the telephone line, and the telephone line is coupled through diodes 729 and 730 to node 777, the transmit signal is applied to both capacitor 743 and 744. Since the transmit signal is in phase at these two capacitors, the transmit signal is applied as a common mode signal, which is canceled out by the single ended to differential conversion network. Thus, the transmit signal is not applied to anti-alias and high pass filter 708. However, since the receive signal is present as a differential signal across the telephone line, and is applied in its differential form across nodes 777 and 793, the receive signal is produced as a differential output by the single-ended to differential conversion network. Thus, the receive signal is applied to anti-alias and high pass filter 708. Since only the receive signal, not the transmit signal, is applied to anti alias and high-pass filter 708, the hybrid function has been provided.

AC and DC line impedance matching is provided by an AC transconductance loop and DC transconductance loop. The AC transconductance loop comprises the single ended to differential conversion network, anti-alias and high-pass filter 708, summer 713, AC impedance filter 714 and transconductance driver 715. The AC transconductance loop may be adjusted to match the off-hook telephone line AC impedance standards. A DC transconductance loop comprises low pass filter and voltage/current (V/I) adjustment block 706, and transconductance control 707, along with external components such as NMOS FET 736. The DC transconductance loop may be adjusted to allow with compliance with off-hook telephone line DC impedance standards.

Solid state relays 763, 764, and 765 and resistors 766 and 767 allow current sensing and switching of the telephone line. Current sensing may be used to implement a parallel pick-up feature. The parallel pick-up feature may be used to disable a modem circuit when a telephone extension is picked up. Such a feature is useful if it is desired to place an emergency voice telephone call while modem communication is in progress on the telephone line. Loop current indicator and step detector 721 may be used to sense a change in voltage caused by a change in current through resistors 766 and 767. The changes detected by loop current indicator and step detector 721 are passed to LED driver 722, which communicates the information to optocoupler 727. Other status signals may be applied at inputs CC0 through CC4. These inputs are passed to LED driver 722, which communicates the information over optocoupler 727.

Command information may be communicated to the AFELIC 701 through optocoupler 726. Signals transmitted through optocoupler 726. Signals transmitted through optocoupler 726 are received by serial interface 717, which provides the signals to digital control block 718. Digital control block 718 uses the signals to control the operation of AFELIC 701 and associated circuitry.

Clock signals applied to node 7109 are passed through capacitor 723 and received by clock generation block 705. Clock generation block 705 provides clock signals to charge pump 704. Clock generation block 705 also provides timing information other portions of AFELIC 701. For example, clock generation block 705 provides timing information to circuits for communicating through capacitors 724 and 725.

Figure 8A:
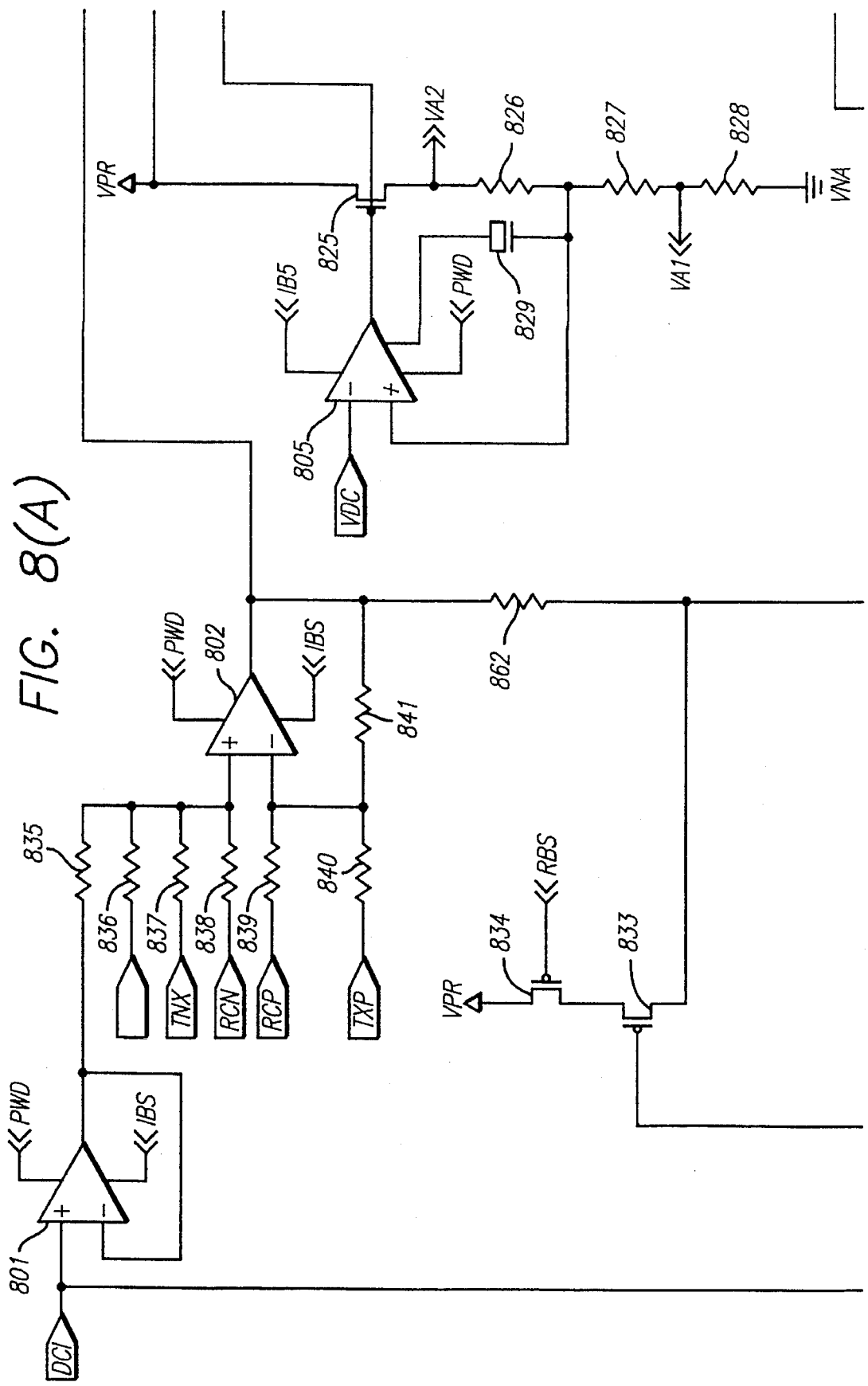
FIGS. 8(A), 8(B), and 8(C) are schematic diagrams of the preferred embodiment of the programmable continuous time circuitry of the present invention.
Figure 8B:
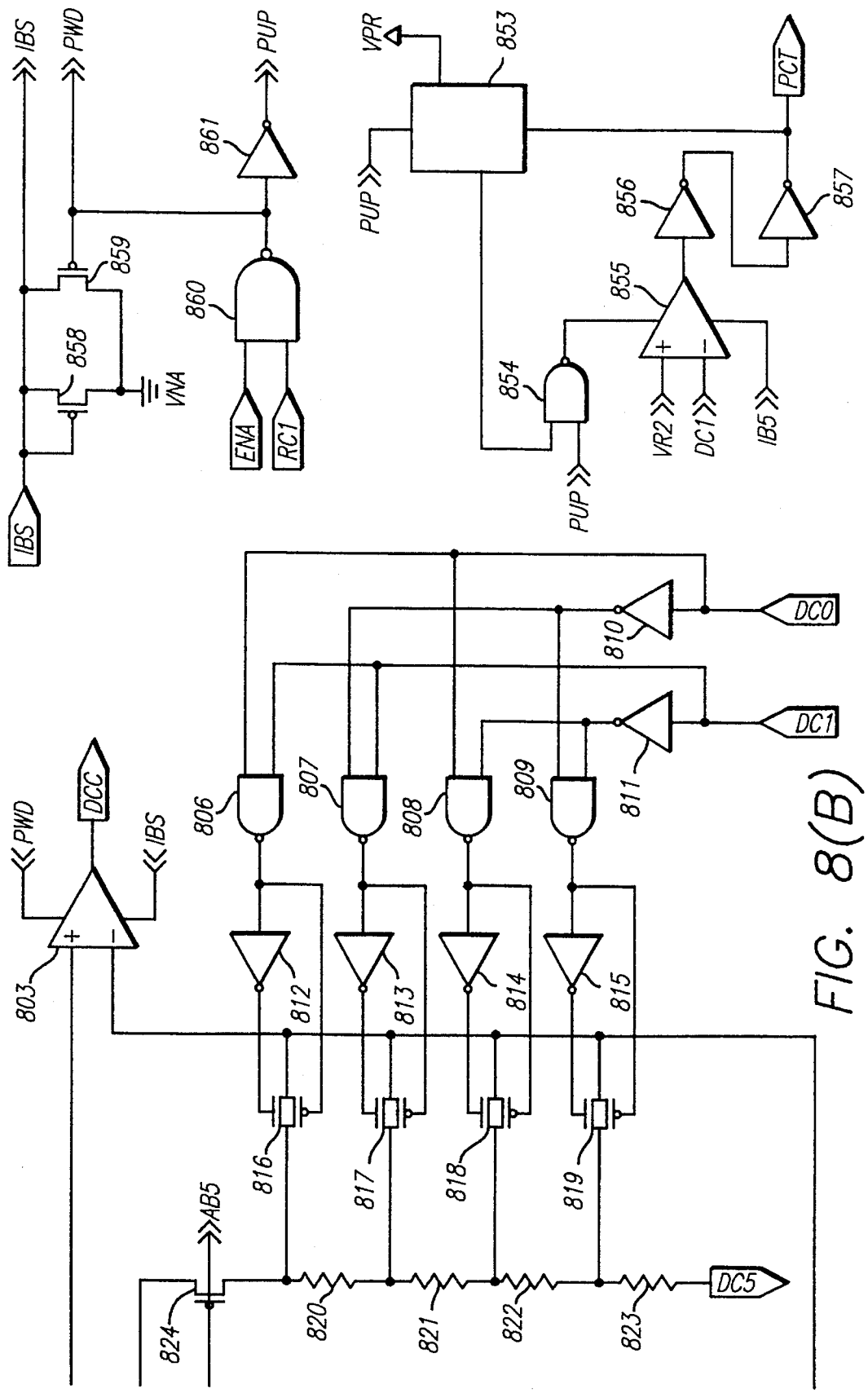
Figure 8C:
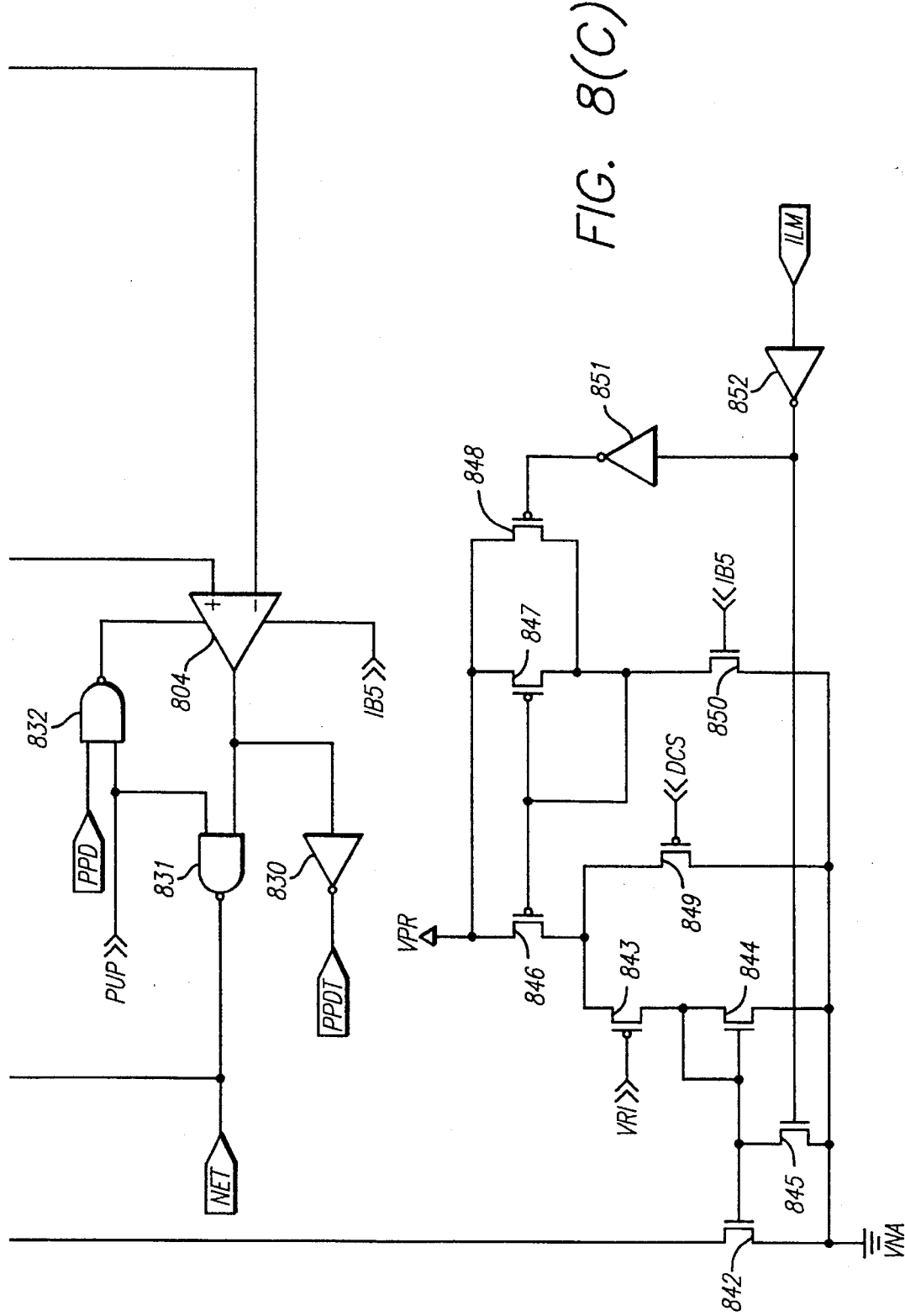
Figure 9:
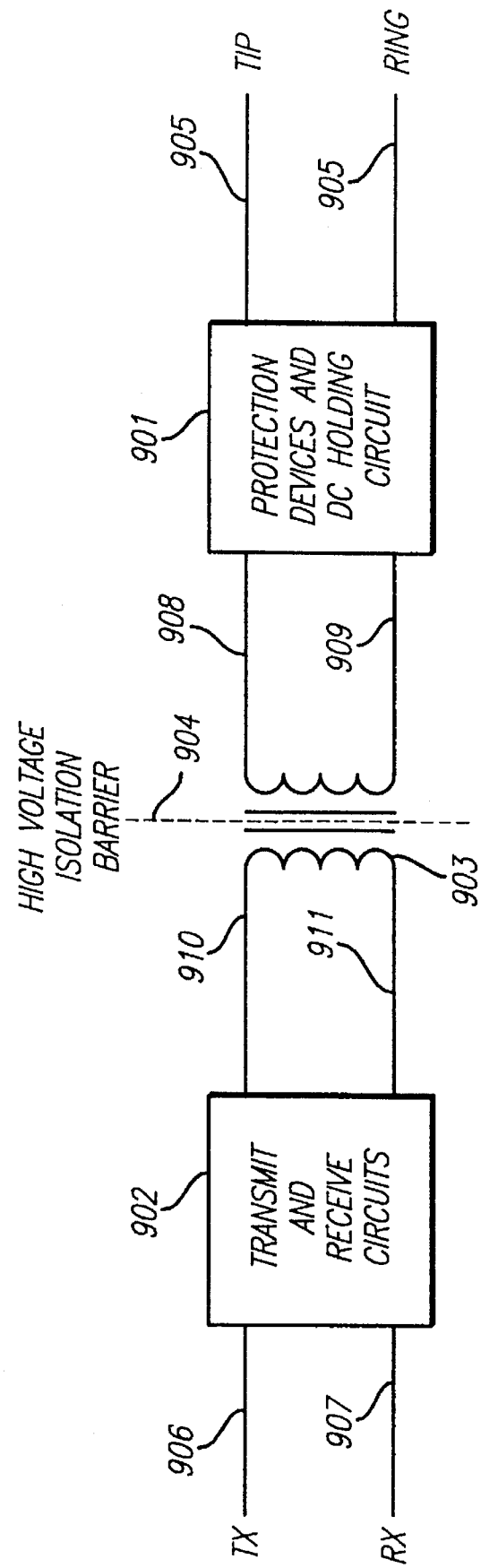
FIG. 9 is a diagram of a telephone line interface circuit of the prior art.

FIGS. 8(A), 8(B), and 8(C) are schematic diagrams of the preferred embodiment of the programmable continuous time circuitry of the present invention. Input DCI is coupled to the non-inverting input of amplifier 801 and to the first terminal of NMOS FET 842. The output of amplifier 801 is coupled to the inverting input of amplifier 801 and to the first terminal of resistor 835. An input signal is coupled to the first terminal of resistor 836. Input TXN is coupled to the first terminal of resistor 837. Input RCN is coupled to the first terminal of resistor 838. Input RCP is coupled to the first terminal of resistor 839. Input TXP is coupled to the first terminal of resistor 840. The second terminal of resistor 835 is coupled to the second terminal of resistor 836, to the second terminal of resistor 837, to the second terminal of resistor 838, and to the non-inverting input of amplifier 802. The second terminal of resistor 839 is coupled to the second terminal of resistor 840, to the inverting input of amplifier 802, and to the first terminal of resistor 841. The output of amplifier 802 is coupled to the second terminal of resistor 841, to the first terminal of resistor 862, and to the non-inverting input of amplifier 803.

Positive supply of voltage VPA is coupled to the first terminal of PMOS FET 834. Input RB5 is coupled to the gate of PMOS FET 834. The second terminal of PMOS FET 834 is coupled to the first terminal PMOS FET 833. The second terminal of PMOS FET 833 is coupled to the second terminal of resistor 862 and to the non-inverting input of amplifier 804. The output of amplifier 804 is coupled to an input of NAND gate 831 and to an input of inverter 830. The output of inverter 830 is coupled to output PPDT the output of NAND gate 831 is coupled to the gate of PMOS FET 833 and to output NGT. Input PPD is coupled to an input of NAND gate 832. Input PUP is coupled to an input of NAND 832 and NAND gate 831. The output of NAND gate 832 is coupled to amplifier 804.

Input DC0 is coupled to an input of inverter 810, to an input of NAND gate 806, and to an input of NAND gate 808. The output of inverter 810 is coupled to an input of NAND gate 807 and to an input of NAND gate 809. Input DC1 is coupled to an input of inverter 811, to an input of NAND gate 806, and to an input of NAND gate 807. The output of inverter 811 is coupled to an input of NAND gate 808 and to an input of NAND gate 809. The output of NAND gate 806 is coupled to an input of inverter 812 and to a positive control terminal of CMOS switch 816. The output of inverter 812 is coupled to a negative control input of CMOS switch 816. The output of NAND gate 807 is coupled to the input of inverter 813 and to the positive control terminal of CMOS switch 817. The output of inverter 813 is coupled to the negative control input of CMOS switch 817. The output of NAND gate 808 is coupled to an input of inverter 814 and to a positive control terminal of CMOS switch 818. The output of inverter 814 is coupled to a negative control input of CMOS switch 818. The output of NAND gate of 809 is coupled to the input of inverter 815 and to a positive control input of CMOS switch 819. The output of inverter 815 is coupled to a negative control input of CMOS switch 819.

Bandgap reference voltage VBG is coupled to the inverting terminal of amplifier 805. Amplifier 805 is coupled to a first terminal of capacitor 829. The output of amplifier 805 is coupled to the gate terminal of PMOS FET 825, to the gate terminal of PMOS FET 824, and to output RB5. Positive supply voltage VPA is coupled to the first terminal of PMOS FET 825 and to the first terminal of PMOS FET 824. The second terminal of PMOS FET 825 is coupled to output VA2 and to the first terminal of resistor 826. The second terminal of resistor 826 is coupled to the second terminal of capacitor 829, to the non-inverting input of amplifier 805, and to the first terminal of resistor 827. The second terminal of resistor 827 is coupled to output VRI and to the first terminal of resistor 828. The second terminal of resistor 828 is coupled to negative supply voltage VNA. The second terminal of PMOS FET 824 is coupled to the first terminal of CMOS switch 816 and to the first terminal of resistor 820. The second terminal of resistor 820 is coupled to the first terminal of CMOS switch 817 and to the first terminal of resistor 821. The second terminal of resistor 821 is coupled to the first terminal of CMOS switch 818 and to the first terminal of resistor 822. The second terminal of resistor 822 is coupled to the first terminal of CMOS switch 819 and to the first terminal of resistor 823. The second terminal of resistor 823 is coupled to output DCS. The second terminal of CMOS switch 816 is coupled to the second terminal of CMOS switch 817, to the second terminal CMOS switch 818, to the second terminal of CMOS switch 819, to the inverting input of amplifier 803, and to the inverting input of amplifier 804.

Input ILM is coupled to the input of inverter 852. The output of inverter 852 is coupled to the input of inverter 851 and to the gate of NMOS FET 845. The output of inverter 851 is coupled to the gate terminal of PMOS FET 848. Positive supply voltage VPA is coupled to the first terminal of PMOS FET 846, to the first terminal of PMOS FET 847, and to the first terminal of PMOS FET 848. The second terminal of PMOS FET 846 is coupled to the first terminal of PMOS FET 843 and to the first terminal of PMOS FET 849. Input VRI is coupled to the gate terminal of PMOS FET 843. Input DCS is coupled to the gate terminal of PMOS FET 849. The second terminal of PMOS FET 843 is coupled to the first terminal of NMOS FET 844, to the gate terminal of NMOS FET 844, to the gate terminal of NMOS 842 and to the first terminal of NMOS FET 845. Negative supply voltage VNA is coupled to the second terminal of NMOS FET 842, to the second terminal of NMOS FET 845, to the second terminal of NMOS FET 844, to the second terminal of PMOS FET 849, and to the second terminal of NMOS FET 850.

Input VR2 is coupled to the non-inverting input of amplifier 855. Input DCI is coupled to the inverting input of amplifier 855. The output of amplifier 855 is coupled to the input of inverter 856. The output of inverter 856 is coupled to the input of inverter 857. The output of inverter 857 is coupled to output PGT and to an input of flip-flop 853. Input PUP is coupled to an input of flip-flop 853. Positive supply voltage VPA is coupled to an input of flip-flop 853. The output of flip-flop 853 is coupled to an input of NAND gate 854. Input PUP is coupled to an input of NAND gate 854. The output of NAND gate 854 is coupled to amplifier 855.

Input IBS is coupled to the gate of NMOS FET 858, to the first terminal of NMOS FET 858, to the first terminal of NMOS FET 859, and to output IBS. Negative supply voltage VNA is coupled to the second terminal of NMOS FET 858 and to the second terminal of NMOS FET 859. Input ENA is coupled to an input of NAND gate 860. Input RGT is coupled to an input of NAND gate 860. The output of NAND gate 860 is coupled to an input of inverter 861, to the gate of NMOS FET 859, and to output PWD. The output of inverter 861 is coupled to output PUP.

Figure 10:
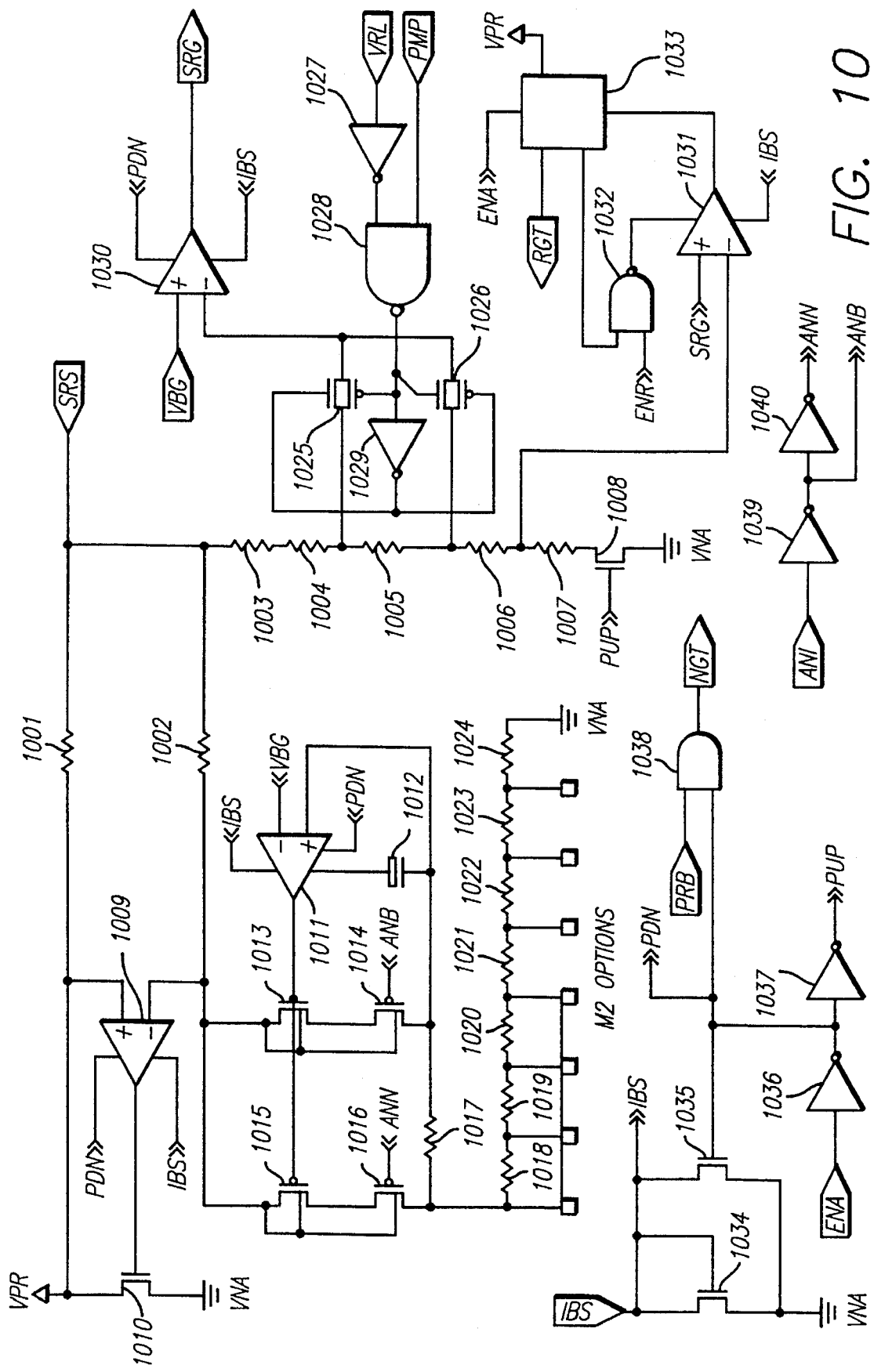
FIG. 10 is a schematic diagram illustrating the circuitry of the series/shunt supply regulator used with the present invention.

FIG. 10 is a schematic diagram illustrating the circuitry of the series/shunt supply regulator used with the present invention. Signal ANI is coupled through inverter 1039 to produce signal ANB. Signal ANB is coupled through inverter 1040 to produce signal ANN.

Signal IBS is coupled to the drain and gate of NMOS FET 1034 and to the drain (signal IBS) of NMOS FET 1035. The sources of NMOS FETs 1034 and 1035 are coupled to ground (VNA). Signal ENA is passed through inverter 1036 to a node (signal PDN) that includes the gate of NMOS FET 1035 and one input of AND gate 1038. Signal PDN is passed through inverter 1037 to generate signal PUP. Signal PAB is coupled to the other input of AND gate 1038. The output of AND gate 1038 is signal NGT.

Signal SRS is coupled through resistor 1001 to the non-inverting input of amplifier 1009 and to the drain (VPA) of NMOS FET 1010, and through resistor 1002 to the inverting input of amplifier 1009. The output of amplifier 1009 is coupled to the gate of FET 1010. The source of FET 1010 is coupled to ground. Signals PDN and IBS are coupled to amplifier 1009.

The node at the inverting input of amplifier 1009 is also coupled to the sources of PMOS FETs 1013 and 1015. FET 1013 is coupled in series with PMOS FET 1014. FET 1015 is coupled in series to PMOS FET 1016. The gate of FET 1016 is coupled to signal ANN. The drain of FET 1016 is coupled through series resistors 1018–1024 to ground, and through resistor 1017 to the drain of FET 1014, one terminal of capacitor 1012 and to the non-inverting input of amplifier 1011. The gate of FET 1014 is coupled to signal ANB. The other terminal of capacitor 1012 is coupled to amplifier 1011 along with signals IBS and PDN. The inverting input of amplifier 1011 is coupled to signal VBG. The output of amplifier 1011 is coupled to the gates of FETs 1013 and 1015.

SRS is coupled through resistors 1003 and 1004 to one input of CMOS switch 1025, through resistor 1005 to one input of CMOS switch 1026, through resistor 1006 to the inverting input of amplifier 1031, and through resistor 1007 to the drain of NMOS FET 1008. The gate of FET 1008 is coupled to signal PUP and the source is coupled to ground.

The other terminals of switches 1025 and 1026 are coupled to the inverting input of amplifier 1030. The non-inverting input of amplifier 1030 is coupled to signal VBG. Signals PDN and IBS are coupled to amplifier 1030, whose output is signal SRG. Signal VAL is coupled through inverter 1027 to one input of NAND gate 1028. Signal PMP is coupled to the other input of NAND gate 1028. The output of NAND gate 1028 is coupled to the p channel gate of switch 1025, to the n channel gate of switch 1026, and to inverter 1029. The output of inverter 1029 is coupled to the n channel gate of switch 1025 and the p channel gate of switch 1026.

The non-inverting input of amplifier 1031 is coupled to signal SRG. The output of amplifier 1031 is coupled to the clock input of flip flop 1033. The D input of flip flop 1033 is coupled to VPA. The RS input of flip flop 1033 is coupled to signal ENA, the Q output is RGT, and the QB output is coupled to one input of NAND gate 1032. The other input of NAND gate 1032 is coupled to signal ENA and its output is coupled to amplifier 1031, along with signal IBS.

Thus, a method and apparatus for providing a telephone line interface having DC and AC transconductance loops has been provided.

I claim:

1. A method for controlling the characteristics of a telephone line interface circuit comprising the steps of:

using a DC transconductance loop to control DC characteristics of a telephone apparatus;

using an AC transconductance loop to control AC characteristics of said telephone apparatus, said AC transconductance loop deriving a power supply voltage from a telephone line, wherein Said step of using an AC transconductance loop to control said AC characteristics of said telephone apparatus comprises the steps of:

AC coupling a telephone line input to a first switched capacitor filter;

coupling a first filter output of said first switched capacitor filter to a first input of a first transconductance driver;

coupling a first telephone line output from said first transconductance driver to a telephone line;

and wherein said step of using a DC transconductance loop to control said DC characteristics of said telephone apparatus comprises the steps of:

DC coupling a telephone line input to a programmable continuous time filter;

coupling a second filter output from said programmable continuous time filter to a second input of a second transconductance driver;

coupling a second telephone line output from said second transconductance driver to said telephone line.

2. A telephone line interface comprising:

an AC transconductance loop for controlling AC characteristics, said AC transconductance loop deriving a power supply voltage from a telephone line, wherein said AC transconductance loop comprises:

an AC coupling component;

a first switched capacitor filter for receiving a telephone line input signal and for providing a first filter output signal;

a transconductance driver for receiving said first filter output signal and for providing a first telephone line output signal; said telephone line interface further comprising:

a DC transconductance loop for controlling DC characteristics, wherein said DC transconductance loop comprises:

a programmable continuous time filter for receiving a telephone line input signal and for providing a second filter output signal;

a transconductance driver for receiving said second filter output signal and for providing a second telephone line output signal.

3. The telephone line interface of claim 2 wherein said AC coupling component comprises a capacitor.

* * * * *